(12) United States Patent
Suzuki et al.

(10) Patent No.: US 6,590,626 B1
(45) Date of Patent: Jul. 8, 2003

(54) LIQUID CRYSTAL DISPLAY, BACKLIGHT UNIT, AND FLUORESCENT TUBE FOR BACKLIGHT UNIT

(75) Inventors: Masaru Suzuki, Yokohama (JP); Fumihisa Hanzawa, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 219 days.

(21) Appl. No.: 09/618,818

(22) Filed: Jul. 18, 2000

(30) Foreign Application Priority Data

Aug. 20, 1999 (JP) .......................................... 11-233919

(51) Int. Cl.[7] .......................................... G02F 1/1335
(52) U.S. Cl. .............................. 349/70; 349/59; 349/65; 349/67; 362/31
(58) Field of Search .............................. 349/67, 59, 70, 349/65, 68; 362/31

(56) References Cited

U.S. PATENT DOCUMENTS

| | | | | |
|---|---|---|---|---|
| 5,029,045 A | * | 7/1991 | Sanai et al. | 362/26 |
| 5,283,674 A | * | 2/1994 | Hanaoka et al. | 359/49 |
| 5,432,626 A | * | 7/1995 | Sasuga et al. | 359/83 |
| 5,645,337 A | * | 7/1997 | Gleckman | 362/29 |

* cited by examiner

Primary Examiner—Robert H. Kim
Assistant Examiner—Andrew Schechter
(74) Attorney, Agent, or Firm—Scully, Scott, Murphy & Presser; Robert M. Trepp

(57) ABSTRACT

A liquid crystal display which comprises a light guide 2 placed at the back of a liquid crystal display panel 1; a first fluorescent tube 3 disposed along at least one side of the light guide 2; a second fluorescent tube 4 disposed adjacent to the first fluorescent tube 3; and a shielding component 5 for shielding an incoming light directly entering from the second fluorescent tube 4 into the first fluorescent tube 3, to reduce a deterioration of luminance that can occur in a backlight for a liquid crystal display panel.

11 Claims, 10 Drawing Sheets

FIG. 10
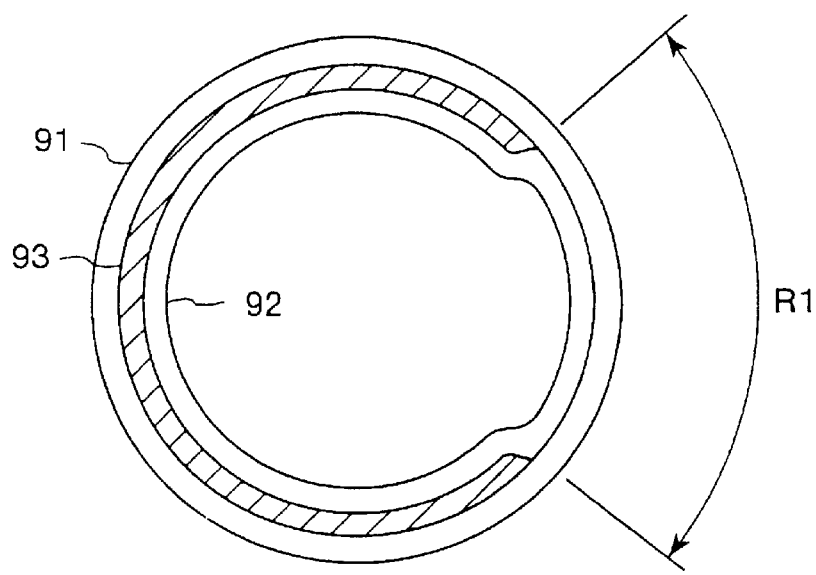
(a)
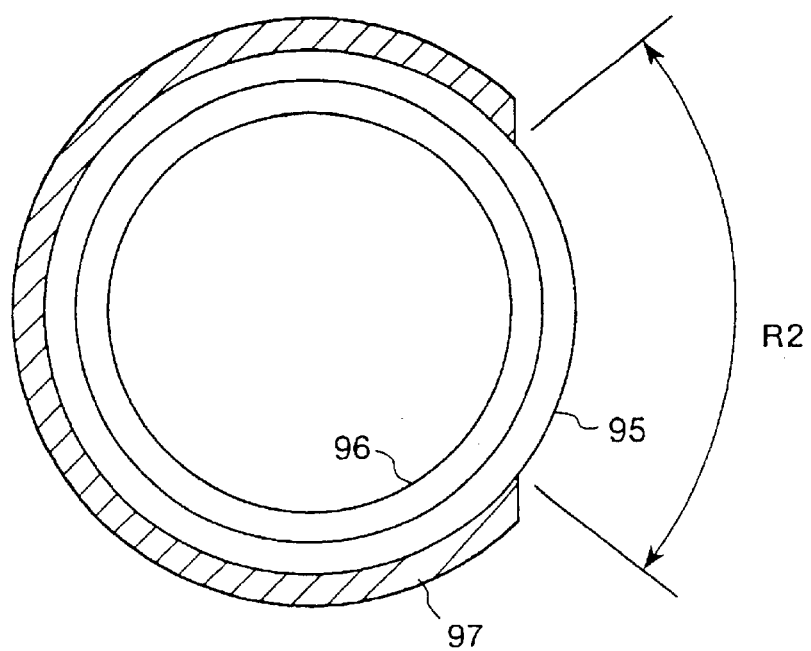
(b)

LIQUID CRYSTAL DISPLAY, BACKLIGHT UNIT, AND FLUORESCENT TUBE FOR BACKLIGHT UNIT

BACKGROUND OF THE INVENTION

1. Technical Field

The present invention relates to a liquid crystal display and a backlight unit for use in a liquid crystal display panel or the like and more particularly to a liquid crystal display and a backlight unit which increase a rate of maintenance of luminance and are effective in a reduction in deterioration of luminance.

2. Prior Art

Recently, a liquid crystal display has been widely adopted as a display device for an image display for a personal computer, a television or the like and for various types of monitors. In general, this type of liquid crystal display comprises a backlight placed at the back of a liquid crystal display panel, the backlight being a planar light source for lighting, wherein a liquid crystal surface having a predetermined spread is wholly illuminated with a light of uniform brightness, whereby an image formed on the liquid crystal surface is formed into a visible image.

In this backlight, a hot cathode or cold cathode fluorescent lamp is adopted as the light source. It is necessary to illuminate the whole surface of the liquid crystal display panel with the light from a so-called linear light source by such a fluorescent tube. Thus, two types, i.e., a directly-under-light type and a side-light type (an edge-light type) have been heretofore adopted. The directly-under-light type comprises the fluorescent tube placed directly under the liquid crystal display panel, and a dimmer and a diffuser disposed on the fluorescent tube. On the other hand, the side-light type comprises the fluorescent tube disposed along two sides or one side of a light guide made of a transparent resin, wherein the light entering into the light guide is directed toward the liquid crystal display panel surface by a reflector worked on the rear surface of the light guide, whereby a uniform and planar light is obtained by using light diffusion.

A hot cathode fluorescent tube is the same type as a general fluorescent tube. That is, the hot cathode fluorescent tube comprises a filament composed of a tungsten wire wound into a coil, the filament being coated with an emitter having a high electron emission coefficient. Therefore, the hot cathode fluorescent tube has a high current density and can thus reduce power consumption in electrodes. Accordingly, the hot cathode fluorescent tube is superior in high efficiency and high luminance. On the other hand, a cold cathode fluorescent tube has the same structure as the hot cathode fluorescent tube except for the electrodes. A mechanism for emitting electrons from the electrodes works not by the action of heat but by secondary electron emission. Although the cold cathode fluorescent tube has low efficiency and low luminance, the cold cathode fluorescent tube is therefore superior in long life.

To use these fluorescent tubes as the backlight for the liquid crystal display, the high luminance and high definition are required. Thus, a technique of disposing a plurality of fluorescent tubes adjacent and parallel to one another has been heretofore adopted. For example, the side-light type comprises the backlight composed of six fluorescent tubes in total, three fluorescent tubes being placed at each side of the backlight, each fluorescent tube having an outer diameter of about 3 mm. A plurality of fluorescent tubes are used as the backlight, whereby the liquid crystal display can be adopted not only into a portable personal computer and word processor but also into desktop information equipment and a television receiver which need the brightness. The CRT-level luminance can be therefore ensured even if transmittance of liquid crystal is taken into account.

The prior art using a plurality of fluorescent tubes as the backlight is disclosed in Japanese Patent Laid-Open Sho 62(1987)-234185, Hei 5(1993)-2165, Hei 10(1998)-177170 and so on. In these publications, it is borne in mind that the reflector is disposed in a housing for holding a plurality of fluorescent tubes and the reflector condenses the lights from a plurality of fluorescent tubes, thereby increasing the luminance. Furthermore, Japanese Patent Laid-Open Hei 10(1998)-177170 discloses the technique in which an electrostatic shielding component made of a conductive material such as aluminum is disposed between the cold cathode fluorescent tubes in order that a plurality of cold cathode fluorescent tubes glow with stability, thereby reducing an electrostatic capacity between the cold cathode fluorescent tubes.

A plurality of fluorescent tubes are thus used, whereby the luminance of a fluorescent tube unit comprising a plurality of fluorescent tubes can be increased. However, it became clear that the life of the fluorescent tube unit could not achieve a development goal. That is, although the lighting life of a single fluorescent tube can achieve a design goal, the deterioration of luminance of the whole fluorescent tube unit is considerable and thus the life cannot be ensured from the viewpoint of the deterioration of luminance.

FIG. 9 is a graph of a result of a continuous lighting life test, showing measured data of the side-light type backlight (an LCD module) using a plurality of cold cathode fluorescent tubes and measured data of a single cold cathode fluorescent tube (a single lamp). In the drawing, a vertical axis indicates a rate of maintenance of luminance and a horizontal axis indicates a lighting time. Besides a measured value of the single lamp, the measured values of four LCD modules, each LCD module using a plurality of cold cathode fluorescent tubes, are shown in the drawing. Generally, the life of the backlight is defined as the lighting time that elapses before the luminance drops to 50% of initial luminance. The greater deterioration of luminance means the shorter lighting time that elapses before the luminance drops to 50%. In the drawing, by comparison of the luminance after an elapse of the lighting time of about 2000 hours, it turned out that the luminance of the LCD module severely deteriorates to about 65% with few exceptions when the single lamp has the rate of maintenance of luminance of about 90%. That is, the extent of the deterioration of luminance is considerable in the case of the LCD module of the backlight using a plurality of fluorescent tubes. This becomes a major problem from the viewpoint of an insurance of the life.

The present invention is made in order to solve the above technical problem. It is an object of the present invention to reduce the deterioration of luminance that can occur in the backlight for the liquid crystal display panel.

SUMMARY OF THE INVENTION

As shown in FIG. 1, a liquid crystal display of the present invention comprises a light guide 2 placed at the back of a liquid crystal display panel 1; a first fluorescent tube 3 disposed along at least one side of the light guide 2; a second fluorescent tube 4 disposed adjacent to the first fluorescent tube 3; and a shielding component 5 for shielding an incoming light directly entering from the second fluorescent tube 4 into the first fluorescent tube 3.

The liquid crystal display further comprises a housing 6 having an inner surface 7 forming a reflecting surface, the housing 6 being opened to the light guide 2, the housing 6 being capable of disposing therein the first fluorescent tube 3 and the second fluorescent tube 4 substantially parallel to each other, wherein the shielding component 5 includes a shield 8 located between the first fluorescent tube 3 and the second fluorescent tube 4 and formed of a part of the housing 6 extending toward the light guide 2. The liquid crystal display is superior in that a rate of maintenance of luminance of a plurality of fluorescent tubes included in the housing 6 can be brought close to the rate of maintenance of luminance of a single fluorescent tube.

Preferably, the shield 8 extends to substantially the same position as a position d1 at which the first fluorescent tube 3 and the second fluorescent tube 4 are adjacent to the light guide 2. Thus, the incoming light directly entering from the adjacent fluorescent tube can be shielded.

Furthermore, in order to sufficiently shield the incoming light directly entering from the adjacent fluorescent tube, it is preferable that the shield 8 extends to a position d2 closer to the light guide 2 than the position at which the first fluorescent tube 3 and the second fluorescent tube 4 face the light guide 2.

The surface of the shield 8 forms the reflecting surface. Thus, it is possible to prevent the light from entering into the adjacent fluorescent tube and to sufficiently illuminate the light guide 2 with the lights emitted from the individual fluorescent tubes.

Although the first fluorescent tube 3 and the second fluorescent tube 4 are used in the present invention, the present invention can be similarly applied to third and fourth fluorescent tubes. Furthermore, even in the case of the single fluorescent tube made of a curved glass tube having a U shape or the like for example, assuming that one tube wall of the U shape or the like of the fluorescent tube is the first fluorescent tube 3 and the other tube wall of the U shape or the like is the second fluorescent tube 4, the present invention can also be grasped. Accordingly, the present invention is not limited to only the completely separate fluorescent tube.

Moreover, the shield 8 does not necessarily intend to completely shield even the indirectly incoming light resulting from diffused reflection or the like. Thus, the shield 8 has only to shield the directly incoming light from the adjacent fluorescent tube.

Furthermore, any type of fluorescent tube such as a hot cathode fluorescent tube or a cold cathode fluorescent tube may be used as the fluorescent tube. However, the present invention is applied to the fluorescent tube in which an electrode substance is sputtered and deposited on a lamp tube and thus a deterioration of luminance occurs, whereby the deterioration of luminance can be reduced. Accordingly, it is preferable that the present invention is applied to such a fluorescent tube.

Furthermore, the fluorescent tube has only to be disposed along at least one side of the light guide 2. However, the same function can be achieved even when the fluorescent tube is disposed along both of one side and another side.

Moreover, a liquid crystal display of the present invention comprises a light guide 2 placed at the back of a liquid crystal display panel 1; a plurality of cold cathode fluorescent tubes 3 and 4 disposed along at least one side of the light guide 2 and disposed substantially parallel to each other; and a separator 5 for separating the lights emitted from the plurality of cold cathode fluorescent tubes 3 and 4.

Preferably, the plurality of cold cathode fluorescent tubes 3 and 4 are held in a housing 6 disposed along one side of the light guide 2, and the separator 5 protrudes from the inner surface of the housing 6 toward the light guide 2. Thus, an influence of a reduction in transmittance of the glass tube constituting the cold cathode fluorescent tubes 3 and 4 can be reduced, and therefore the deterioration of luminance can be brought close to the deterioration of luminance of the single fluorescent tube. The cold cathode fluorescent tube, in particular, emits electrons by secondary electron emission. Thus, when an abnormal region is lighted at the time of discharge, the electrode substance is sputtered and the electrode substance is prone to be specularly deposited on the lamp tube. Therefore, the present invention is superior in that the influence of the reduction in the transmittance of the glass tube can be reduced even when such a cold cathode fluorescent tube is used.

Moreover, a liquid crystal display of the present invention comprises a diffuser and a dimmer or neutral density filter placed at the back of a liquid crystal display panel; a fluorescent tube placed at the back of the diffuser and the dimmer or neutral density filter; a housing for holding the fluorescent tube; and a shielding component disposed in the housing and disposed so as to reduce the number of times that the light emitted from the fluorescent tube passes through a tube wall of the fluorescent tube. Thus, the present invention is superior in that the deterioration of luminance can be reduced even when a so-called directly-under-light type backlight is adopted.

Preferably, a plurality of fluorescent tubes are included in the housing, and the shielding component is disposed between the plurality of fluorescent tubes and shields the directly incoming light from the adjacent fluorescent tube. Thus, the deterioration of luminance of a fluorescent tube unit comprising a plurality of fluorescent tubes can be brought close to the deterioration of luminance of the single fluorescent tube.

Furthermore, the fluorescent tube has a curved tube structure, and the shielding component is disposed between adjacent portions of the curved fluorescent tube. Thus, the liquid crystal display does not necessarily have a plurality of straight fluorescent tubes. Also when one or a few fluorescent tubes curved into the U shape or the like are used, it is possible to prevent a plurality of passages of the light through the glass tube constituting the curved fluorescent tube. As a result, the extent of the deterioration of luminance can be reduced.

The curved fluorescent tube may be U-shaped as described above or comprise a meandering glass tube. In the latter case, preferably, the shielding component is disposed between the adjacent portions of the glass tube.

Moreover, referring to FIG. 1, a backlight unit of the present invention comprises a housing 6 opened at one side, for accommodating a plurality of fluorescent tubes 3 and 4 therein; and a shielding component 5 disposed in the housing 6, for shielding the incoming light directly entering from the fluorescent tube 3 into the fluorescent tube 4 and vice verse.

The housing 6 is opened to the back or the side of a liquid crystal display panel 1, and the inner surface 7 of the housing 6 forms the reflecting surface. Thus, an insurance of life of a backlight can be appropriately provided regardless of the type of backlight such as the directly-under-light type or side-light type.

Furthermore, a backlight unit of the present invention comprises a fluorescent tube unit 9 composed of plural or curved fluorescent tubes 3, 4 and 10 placed at the back or the side of a liquid crystal display panel 1, wherein the fluorescent tube unit 9 reduces interaction by the incoming light among the fluorescent tubes constituting the fluorescent tube unit 9 so that a rate of maintenance of luminance of the whole fluorescent tube unit 9 may be brought close to the rate of maintenance of luminance of a single fluorescent tube 10 constituting the fluorescent tube unit 9.

Preferably, the fluorescent tube unit 9 reduces the number of times that the light in the fluorescent tube unit 9 passes through the tube walls of the fluorescent tubes 3, 4 and 10. Thus, the influence of contamination resulting from a deposition of a compound in the fluorescent tube can be minimized. Therefore, the rate of maintenance of luminance of the fluorescent tube unit 9 can be brought close to the rate of maintenance of luminance of the single fluorescent tube 10.

More specifically, the fluorescent tube unit 9 includes a separator 5 for separating the plural or curved fluorescent tubes 3, 4 and 10. Thus, such a function can be simply and fully achieved.

Furthermore, preferably, a liquid crystal display of the present invention comprises a liquid crystal display panel; and a fluorescent tube unit composed of plural or curved fluorescent tubes placed at the back or the side of the liquid crystal display panel, wherein at least one of the plural fluorescent tubes or the curved fluorescent tube constituting the fluorescent tube unit includes a reflecting film for reducing the interaction by the incoming light to or from the adjacent fluorescent tube. Without providing the housing 6 with the separator 5, the rate of maintenance of luminance of the fluorescent tube unit can be thus brought close to the rate of maintenance of luminance of the single fluorescent tube.

Specifically, the reflecting film is formed inside or outside a glass tube of the fluorescent tube. Furthermore, the reflecting film can have a predetermined aperture angle so as to shield the light at any angles other than the aperture angle. Furthermore, preferably, the aperture angle of the reflecting film is 77 degrees or less. Thus, it is possible to more effectively shield the incoming light to or from the adjacent fluorescent tube.

Moreover, a fluorescent tube for a backlight unit of the present invention, which is used in a state in which plural or curved fluorescent tubes are placed at the back or the side of a liquid crystal display panel, comprises a glass tube wall having a predetermined diameter; a fluorescent material provided on the glass tube wall and converting an ultraviolet light emitted from mercury excited by discharge into a visible light, thereby emitting the light; and a reflecting film formed on an inner wall or an outer wall of the glass tube and having a predetermined aperture angle in order to reduce the interaction by the incoming light to or from the adjacent fluorescent tube used for the backlight unit. When the fluorescent tube is used for the backlight unit, the deterioration of luminance of the unit including the adjacent fluorescent tube can be reduced.

Preferably, the aperture angle of the reflecting film is such an angle that the light does not reach to the adjacent fluorescent tube or such an angle that the light from the adjacent fluorescent tube does not reach into an aperture. Most preferably, the aperture angle is 77 degrees or less. Furthermore, a metalescent material such as aluminum or a white material such as titanium oxide is excellent for the material of the reflecting film.

BRIEF DESCRIPTION OF THE DRAWINGS

Preferred embodiments of the present invention will now be described, by way of example only, with reference to the accompanying drawings in which:

FIGS. 10(a) and 10(b) are illustrations for illustrating a fluorescent tube of a third embodiment.

DETAILED DESCRIPTION OF THE PREFERRED EMBODIMENTS OF THE INVENTION

This invention will be described in detail below with reference to embodiments shown in the accompanying drawings.

Figure 1:
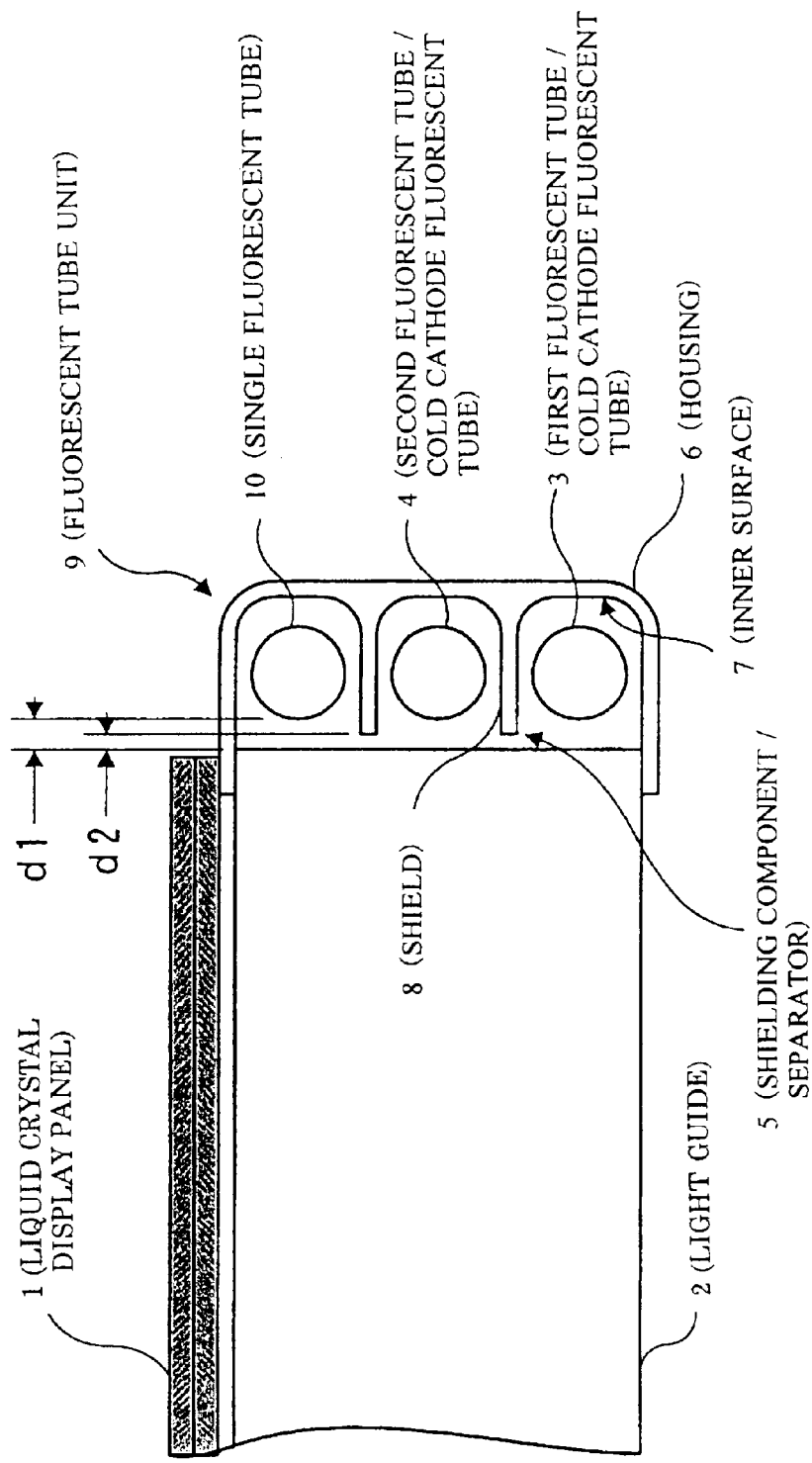
FIG. 1 is an illustration for illustrating a general constitution of the present invention.
Figure 2:
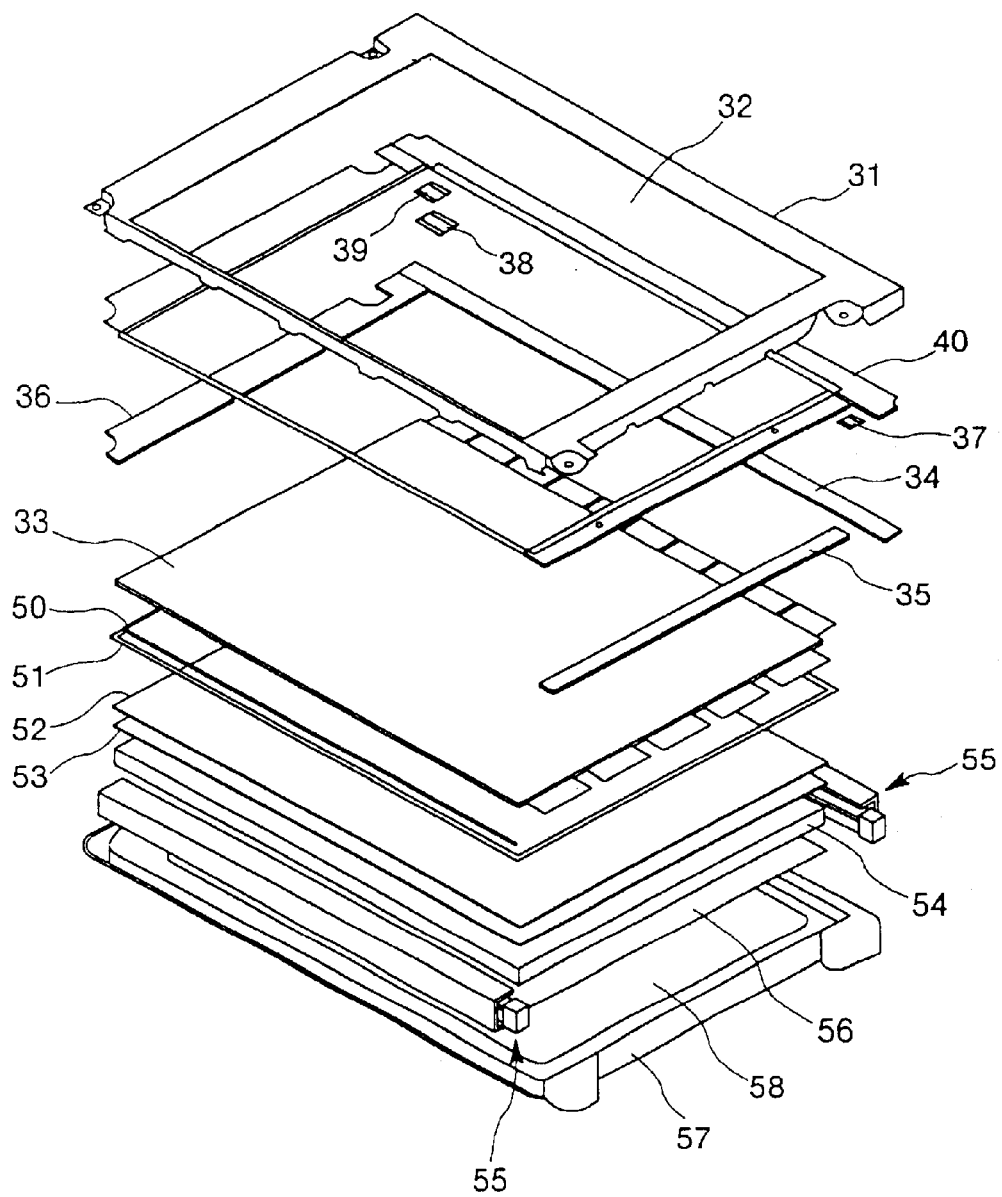
FIG. 2 is a perspective view for illustrating the whole constitution of a liquid crystal display of an embodiment.

FIG. 2 is a perspective view for illustrating the whole constitution of a liquid crystal display of this embodiment. Numeral 31 denotes a metallic shield case for forming an upper frame. The shield case 31 has a display window 32 for delimiting an effective screen of a liquid crystal display module. Numeral 33 denotes a liquid crystal display panel. A TFT (thin film transistor) comprising a deposition of source and drain electrodes, a gate electrode, an amorphous silicon layer, etc., a color filter and so on are laminated between two glass substrates of the liquid crystal display panel 33. A drain circuit substrate 34, a gate circuit substrate 35 and an interface circuit substrate 36 are formed on the liquid crystal display panel 33. Additionally, joiners 37, 38 and 39 for connecting the circuit substrates are provided on the liquid crystal display panel 33. These circuit substrates 34, 35 and 36 are fixed to the shield case 31 through an insulating sheet 40.

On the other hand, a shielding spacer 51 is disposed under the liquid crystal display panel 33 through a rubber cushion 50. A diffuser 52 and a prism sheet 53 are disposed under the shielding spacer 51. The diffuser 52 has a function of diffusing a light from a light guide described below in order to obtain the uniform and planar light. The prism sheet 53 is used in order to increase luminance in a front direction. Furthermore, a light guide 54 is disposed under the prism sheet 53, and fluorescent tube units 55 are disposed at two sides of the light guide 54. Furthermore, a reflector 56 is disposed under the light guide 54 so that the light entering from the fluorescent tube units 55 into the light guide 54 can be reflected toward the liquid crystal display panel 33. Moreover, a lower case 57 having an opening 58 is provided under the reflector 56.

Figure 3:
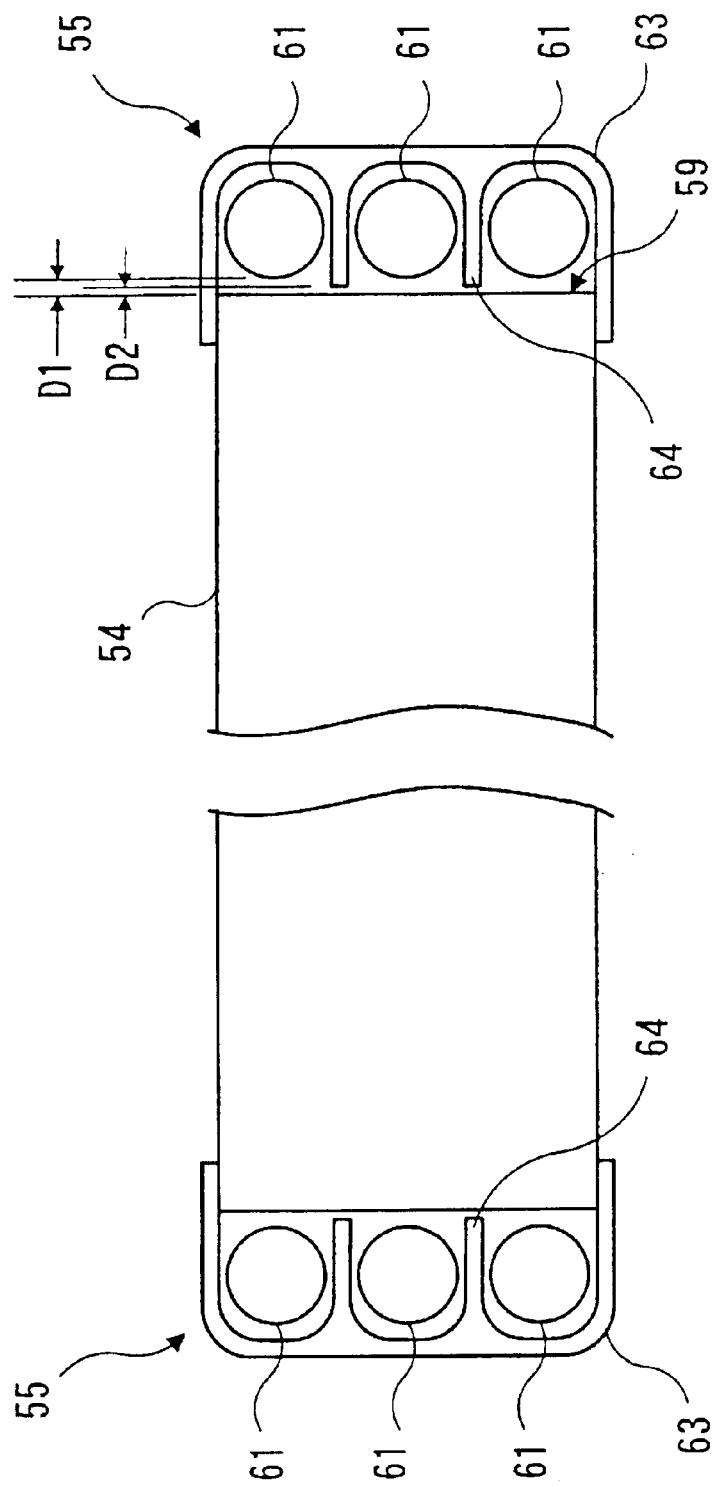
FIG. 3 is an illustration for illustrating a backlight structure of a first embodiment.

FIG. 3 is an illustration for illustrating a backlight structure of this embodiment. In this embodiment, a side-light type backlight is used as the backlight. The fluorescent tube units 55 are disposed at two sides (both the sides) of the light guide 54. An acrylic resin having a thickness of about 12 mm and excellent transmittance is used as the light guide 54. For example, polymethyl methacrylate (having a refractive index of 1.49 and a critical reflection angle of 42 degrees) is adopted. Each of the fluorescent tube units 55 disposed at both the sides of the light guide 54 includes a plurality of fluorescent tubes 61 in a housing 63. In this embodiment, three fluorescent tubes at each side, i.e., six fluorescent tubes in total are spaced at a predetermined distance substantially parallel to one another in the direction of the thickness of the light guide 54. In this embodiment, a cold cathode fluorescent tube made of a glass tube having an outer diameter φ of 3 mm is adopted as the fluorescent tube 61. Nickel is used as a cold cathode. The housing 63 comprises a molded component of polyethylene terephthalate (PET) in which silver is evaporated on the inside of the molded component for holding the fluorescent tubes 61, so that the lights emitted from the fluorescent tubes 61 are reflected toward the light guide 54 and the reflected lights are condensed on the light guide 54, whereby the luminance can be increased.

The housing 63 includes a separator 64 protruding from the inner portion of the housing 63. The separator 64 is located between the adjacent fluorescent tubes 61 in the fluorescent tube unit 55. The separator 64 protrudes toward an incident end 59 of the light guide 54 as shown in FIG. 3. A distance D2 between the incident end 59 of the light guide 54 and the end of the separator 64 is shorter than a distance D1 between a tangent to the outer diameter of the fluorescent tube 61 and the incident end 59. In other words, the end of the separator 64 is closer to the incident end 59 of the light guide 54 than the outer diameter of the glass tube of the fluorescent tube 61. In this embodiment, the separator 64 is formed of an extending part of the housing 63. The separator 64 comprises the molded component of PET on which silver is evaporated. Both of the upper and lower surfaces of the separator 64 facing each fluorescent tube 61 have the function of reflecting the light. The separator 64 is thus constituted, whereby the light emitted from the fluorescent tube 61 does not enter into the adjacent fluorescent tube 61. That is, the interaction of the lights emitted from the fluorescent tubes 61 is reduced. Therefore, the fluorescent tube unit comprising the fluorescent tubes 61 is equivalent to a parallel combination of as many separate fluorescent tubes 61 as the fluorescent tubes 61 constituting the fluorescent tube unit. Preferably, the separator 64 is thin from the viewpoint of a reduction of the thickness of the backlight.

Figure 4:
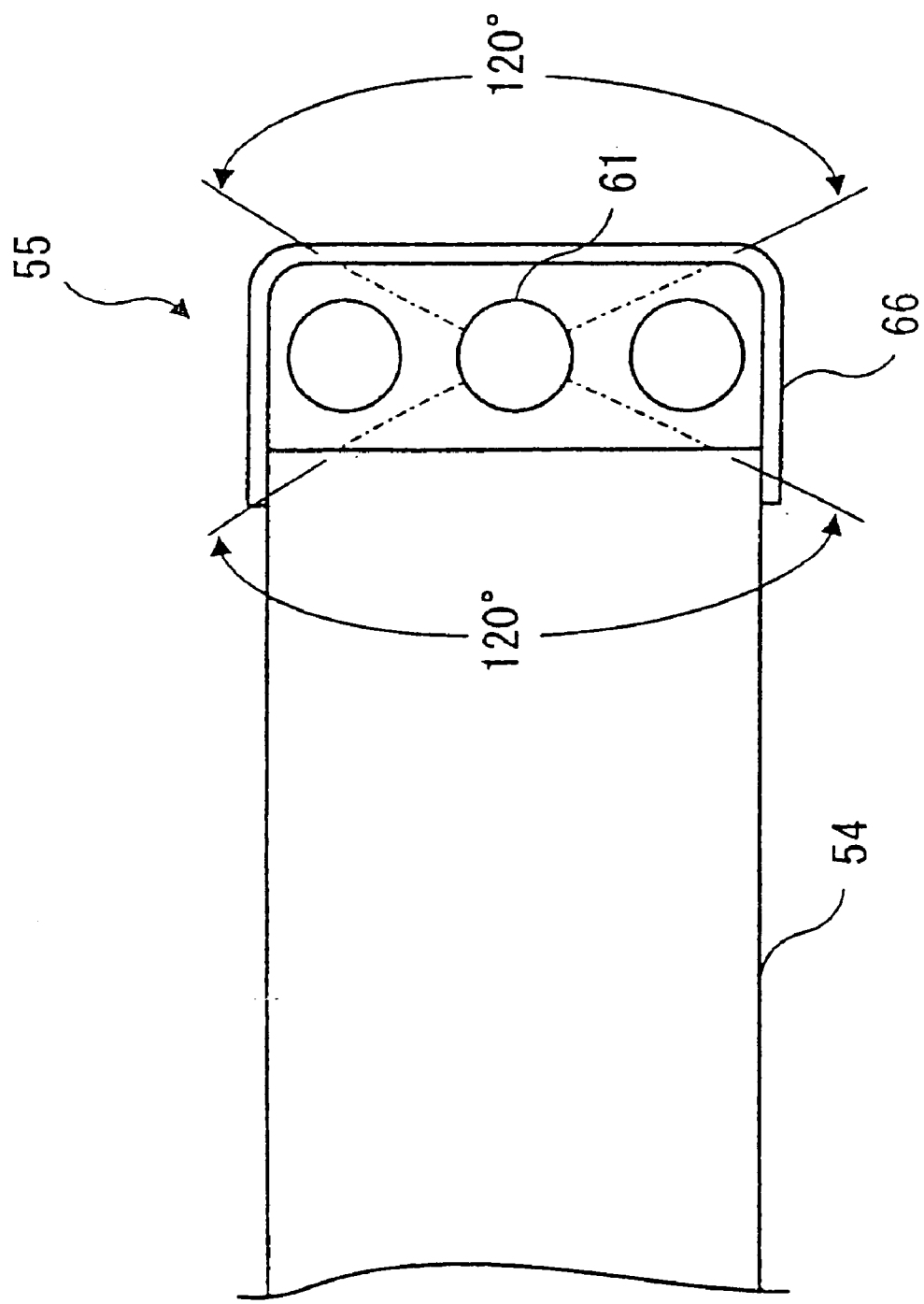
FIG. 4 is an analytical illustration of a fluorescent tube unit of the prior art.

FIG. 4 is an analytical illustration for simulating the reduction in the transmittance that occurs when a housing 66 of the prior art having no separator is used in the fluorescent tube unit 55. As described above, when the multiple light side-light type backlight of the prior art is used, the luminance greatly deteriorates. More specifically, after an elapse of a lighting time of about 2000 hours, when a rate of maintenance of luminance of a single lamp is 90%, the luminance of the LCD module (the fluorescent tube unit) severely deteriorates to 65% due to an influence of the interaction of the lights from the fluorescent tubes 61. A cause of this deterioration of luminance was elucidated in the following manner. By analyzing the cause of occurrence of the deterioration of luminance of the single lamp of the fluorescent tube 61, it turned out that the deterioration of luminance of the single lamp is caused not by the deterioration of a fluorescent material but by the reduction in the transmittance due to contamination of the glass tube. That is, the deterioration of luminance occurs because the fluorescent material generally emits the light in the following manner. More specifically, mercury vapors are filled into the glass tube, the cold cathode fluorescent tube emits electrons by secondary electron emission by a nickel pipe or the like, and the electrons collide with atoms of the mercury vapors, whereby the fluorescent material outputs and emits an ultraviolet light. However, sputtering of an electrode substance generates an amalgam, a compound of mercury and the substance. Consequently, this compound is deposited on the glass tube, thus the transmittance is reduced, and therefore the rate of maintenance of luminance of the single lamp is reduced.

The deterioration of luminance of the LCD module, which occurs when the housing of the prior art of FIG. 4 is used, was discussed in consideration of such an elucidation of the cause of the reduction in the rate of maintenance of luminance of the single lamp.

First, the luminance of a tube wall of the single lamp is measured to check the deterioration of luminance of the single lamp. At the time of this measurement, the light emitted from the fluorescent material is in a state in which the light has passed through the glass tube only once. However, in the LCD module for use in the backlight, the light emitted from the fluorescent tube 61 enters into the light guide 54, while passing through a plurality of fluorescent tubes 61. That is, the emitted light passes through the glass tube only once in the single lamp, whereas the light emitted from each fluorescent tube 61 passes through the glass tube plural times in the LCD module. That is, the inventor discovered that the luminance severely deteriorates because the LCD module undergoes a plurality of experiences of the cause of the reduction in the transmittance of the glass tube.

To quantitatively grasp this discovery made by the inventor, simulation was done by using modeling of FIG. 4. In FIG. 4, three fluorescent tubes 61 are arranged at one side.

First, the modeling was done as described below. The light, which is emitted from the fluorescent tube 61 toward the light guide 54 and has an angle of 120 degrees, directly enters into the light guide. The light, which is emitted in the direction opposite to the light guide 54 and has an angle of 120 degrees, is reflected by a reflecting sheet or the like on an inner surface of the housing 66. Then, the light passes through the fluorescent tube 61 once (i.e., the light passes through the glass tube wall three times in total). Then, the light enters into the light guide 54. The remaining one-third light passes through the adjacent fluorescent tube 61, then the light passes through the fluorescent tube 61 twice (i.e., the light passes through the glass tube wall five times in total), and then the light enters into the light guide 54.

If the rate of maintenance of luminance of the single lamp is represented by mL and the rate of maintenance of luminance of the backlight of the LCD module is represented by mB, a relationship between mL and mB is expressed as equation (1).

$$mB = [mL + (mL)^3 + (mL)^5]/3 \quad (1)$$

If the initial luminance of the lamp is represented by LL(0) and the luminance of the lamp after t hours is represented by LL(t), the following equation is formulated.

$$mL = LL(t)/LL \quad (0)$$

If the initial luminance of the backlight is represented by LB(0) and the luminance of the backlight after t hours is represented by LB(t), the following equation is formulated.

$$mB = LB(t)/LB \quad (0)$$

That is, as expressed as equation (1), the light emitted toward the light guide 54 and having an angle of 120 degrees is expressed as the term of the first power of the rate of maintenance of luminance (mL) of the single lamp (i.e., this light is equivalent to the single lamp), because this light passes through the glass tube wall once. The light emitted in the direction opposite to the light guide 54 and having an angle of 120 degrees is expressed as the term of the third power of (mL) because this light passes through the glass tube wall three times in total. The remaining one-third light passing through the adjacent fluorescent tube 61 is expressed as the term of the fifth power of (mL) because this light passes through the glass tube wall five times in total. A mean value of these values is the rate of maintenance of luminance (mB) of the backlight.

Figure 5:
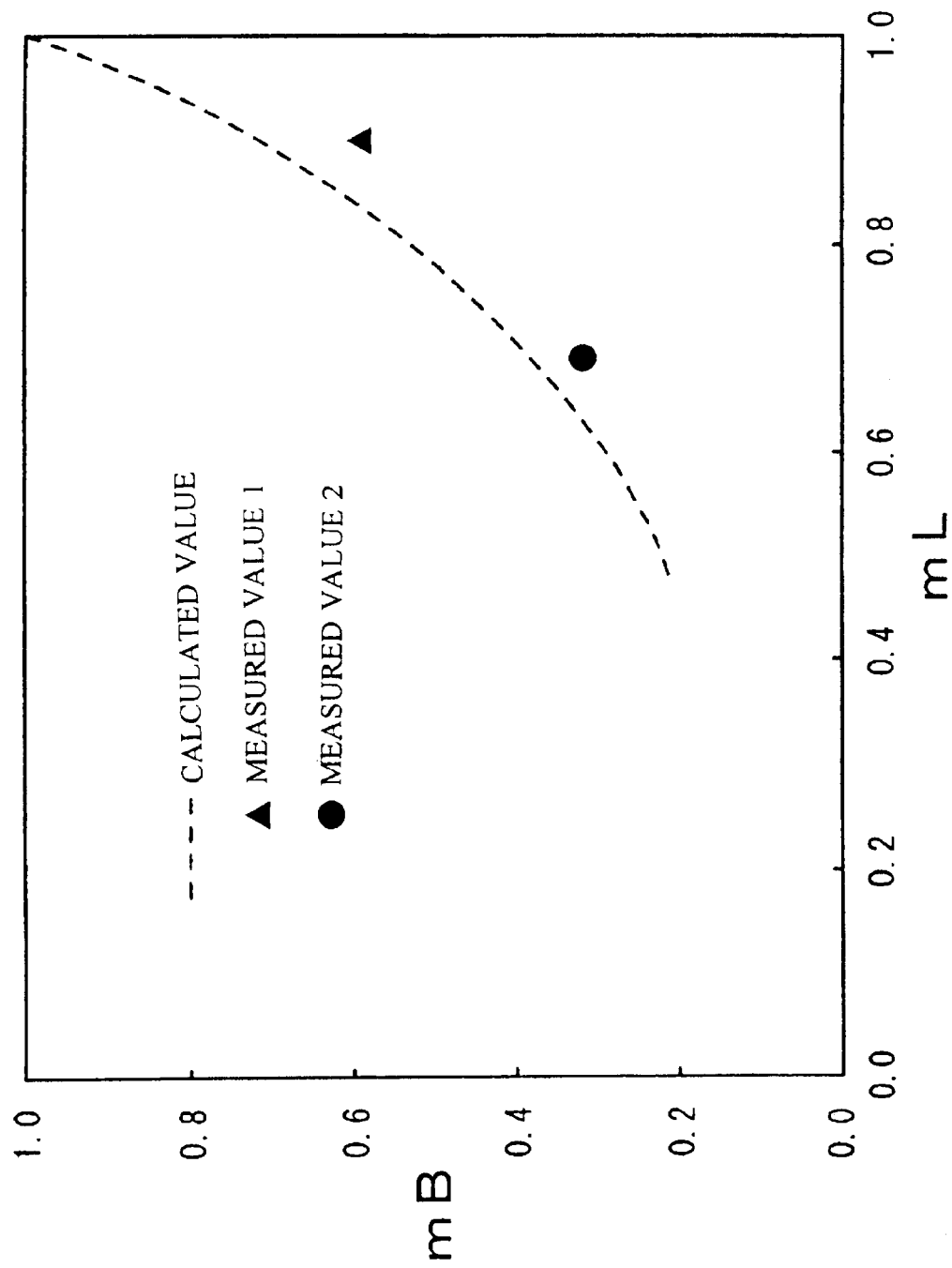
FIG. 5 is a graph for comparing a calculated value to a measured value.

FIG. 5 is a graph for comparing a calculated value obtained by equation (1) to a measured value. A horizontal axis indicates the rate of maintenance of luminance (mL) of the single lamp, a vertical axis indicates the rate of maintenance of luminance (mB) of the backlight of the LCD module, and a broken line indicates the calculated value obtained by equation (1).

A measured value 1 and a measured value 2 represent the values which are obtained by measuring the luminance mB of the backlight when the fluorescent tube 61 is placed in the housing 66 shown in FIG. 4, where the fluorescent tube 61 has the rate of maintenance of luminance reduced to mL=0.9 and mL=0.7. In an actual experiment, the whole surface of the fluorescent tube 61 was coated with the substance for absorbing the light (for example, Kapton tape was wrapped around the fluorescent tube 61), whereby the fluorescent tube 61 having the rate of maintenance of luminance reduced to mL=0.9 and mL=0.7 was easily made.

As is clear from FIG. 5, the calculated value obtained by equation (1) and the measured values exhibited substantially the same tendency. It could be thus confirmed that the calculated value obtained by equation (1) is appropriate. To our surprise, the following fact was also confirmed. Although the luminance of a single fluorescent tube 61 drops to about 70%, the luminance of a plurality of fluorescent tubes 61 placed in the LCD module as the fluorescent tube unit 55 drops to 31% in terms of the measured value. That is, the interaction of the fluorescent tubes 61 of LCD module has a considerable influence on the reduction in the rate of maintenance of luminance.

As can be seen from the above discussion and confirmation, it is effective that the terms of the third power and fifth power of (mL) in equation (1) are eliminated in order to reduce the deterioration of luminance of the LCD module. Thus, in this embodiment, as shown in FIG. 3, the separator 64 is formed of the extending inner part of the housing 63, whereby the fluorescent tubes 61 are separated from one another so as to reduce the incoming light from the adjacent fluorescent tube 61. By this constitution, the rate of maintenance of luminance of the LCD module taking the form of a backlight unit comprising a plurality of adjacent fluorescent tubes 61 can be brought close to the rate of maintenance of luminance of the single fluorescent tube 61.

An effect of the separator 64 shown in FIG. 3 of this embodiment was confirmed by using the above-mentioned modeling for obtaining equation (1). The effect of the separator 64 eliminates a need to consider the remaining one-third light other than the 120-degree lights emitted toward the front and the rear as illustrated in FIG. 4, namely, the incoming light emitted toward both the sides. As a result, the modeling is done as described below. The half light (having an angle of 180 degrees) directly enters into the light guide 54. On the other hand, the remaining half light (having an angle of 180 degrees) is reflected by the reflector disposed inside the housing 63, then the light again passes through the fluorescent tube 61 (i.e., the light passes through the glass tube wall three times in total), and then the light enters into the light guide 54.

If the rate of maintenance of luminance (mL) of the single lamp (the fluorescent tube 61) and the rate of maintenance of luminance (mB) of the backlight of the LCD module are represented by the same reference symbols as the reference symbols in equation (1), the relationship between mL and mB is expressed as equation (2).

$$mB=[mL+(mL)^3]/2 \qquad (2)$$

That is, it can be understood that the term of the fifth power in equation (1) is eliminated and thus the rate of maintenance of luminance (mB) of the backlight of the LCD module is brought close to the rate of maintenance of luminance (mL) of the single lamp.

Figure 6:
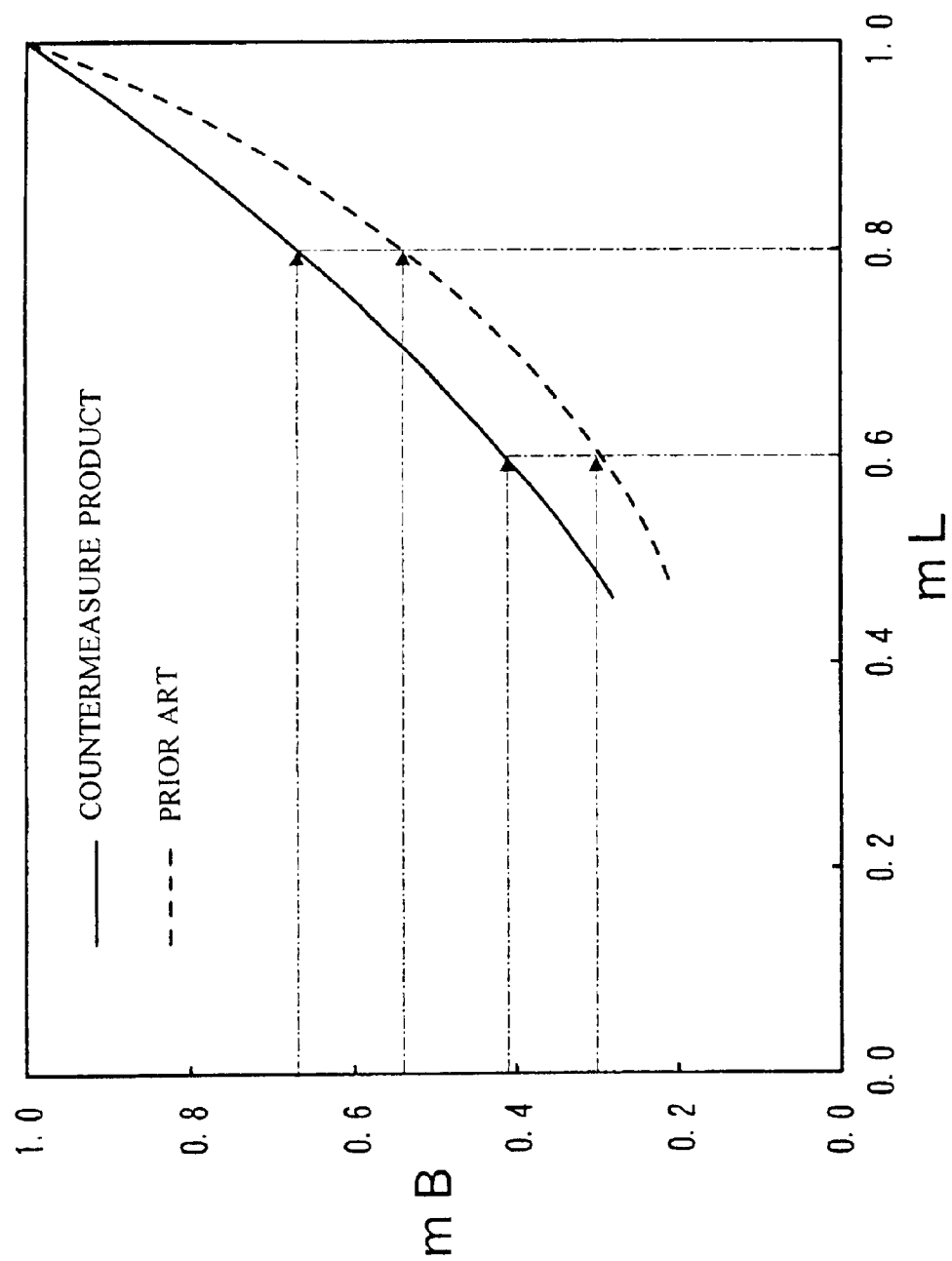
FIG. 6 is a graph showing a difference in a rate of maintenance of luminance between the prior art and a countermeasure product.

FIG. 6 is a graph showing a difference in the rate of maintenance of luminance between the prior art and a countermeasure product. Similarly to FIG. 5, the horizontal axis indicates the rate of maintenance of luminance (mL) of the single lamp, and the vertical axis indicates the rate of maintenance of luminance (mB) of the backlight of the LCD module. In the drawing, a solid line indicates the calculated value which is obtained when the housing 63 of the countermeasure product of this embodiment shown in FIG. 3 is used, and a broken line indicates the calculated value which is obtained when the housing 66 of the prior art shown in FIG. 4 is used.

As is apparent from FIG. 6, when the rate of maintenance of luminance of the single lamp becomes 80% (mL=0.8), the rate of maintenance of luminance of the prior art drops to 55% (mB=0.55), but the luminance of the countermeasure product is kept at 66% (mB=0.66). That is, the rate of maintenance of luminance is improved by 11 points. When the rate of maintenance of luminance of the single lamp becomes 60% (mL=0.6), the luminance of the prior art drops to 30% (mB=0.3), but the luminance of the countermeasure product is kept at 41% (mB=0.41). Also in this case, the rate of maintenance of luminance can be improved by 11 points.

As described in detail above, according to this embodiment, even when a plurality of fluorescent tubes 61 are used in the backlight placed at the back of the liquid crystal display panel, the incoming light from the adjacent fluorescent tube 61 is shielded, whereby it is possible to reduce the number of times that the light passes through the glass tube wall of the fluorescent tube 61. Consequently, the extent of the deterioration of luminance can be brought close to the extent of the deterioration of luminance of the single lamp. Accordingly, the deterioration of luminance of the LCD module for the backlight can be minimized.

In this embodiment in FIG. 3, the distance D2 between the separator 64 and the incident end 59 is shorter than the distance D1 between the tangent to the outer diameter of the fluorescent tube 61 and the incident end 59. However, even if the distance D2 is approximately equal to the distance D1, the same effect is obtained. Even if the relationship between the distance D2 and the distance D1 is reversed, i.e., D2>D1, the effect is decreased compared to the effect of this embodiment, but the level of the deterioration of luminance can be reduced compared the level of the prior art.

In this embodiment, a plurality of individual and independent fluorescent tubes 61 are disposed in the housing 63. However, a single curved fluorescent tube having a U shape or the like is regarded as a plurality of fluorescent tubes and the separator 64 is located between curved portions of the U shape or the like, whereby although there is a difference in effect, the same functional effect can be obtained.

In a first embodiment, the so-called side-light type backlight comprising the fluorescent tube unit 55 disposed along two sides or one side of the light guide 54 has been described above. In a second embodiment, the present invention is applied to a so-called directly-under-light type backlight comprising the fluorescent tube disposed directly under the liquid crystal display panel.

The same elements as the elements of the first embodiment are indicated by the same reference numerals as the reference numerals of the first embodiment, and the detailed description is omitted.

Figure 7:
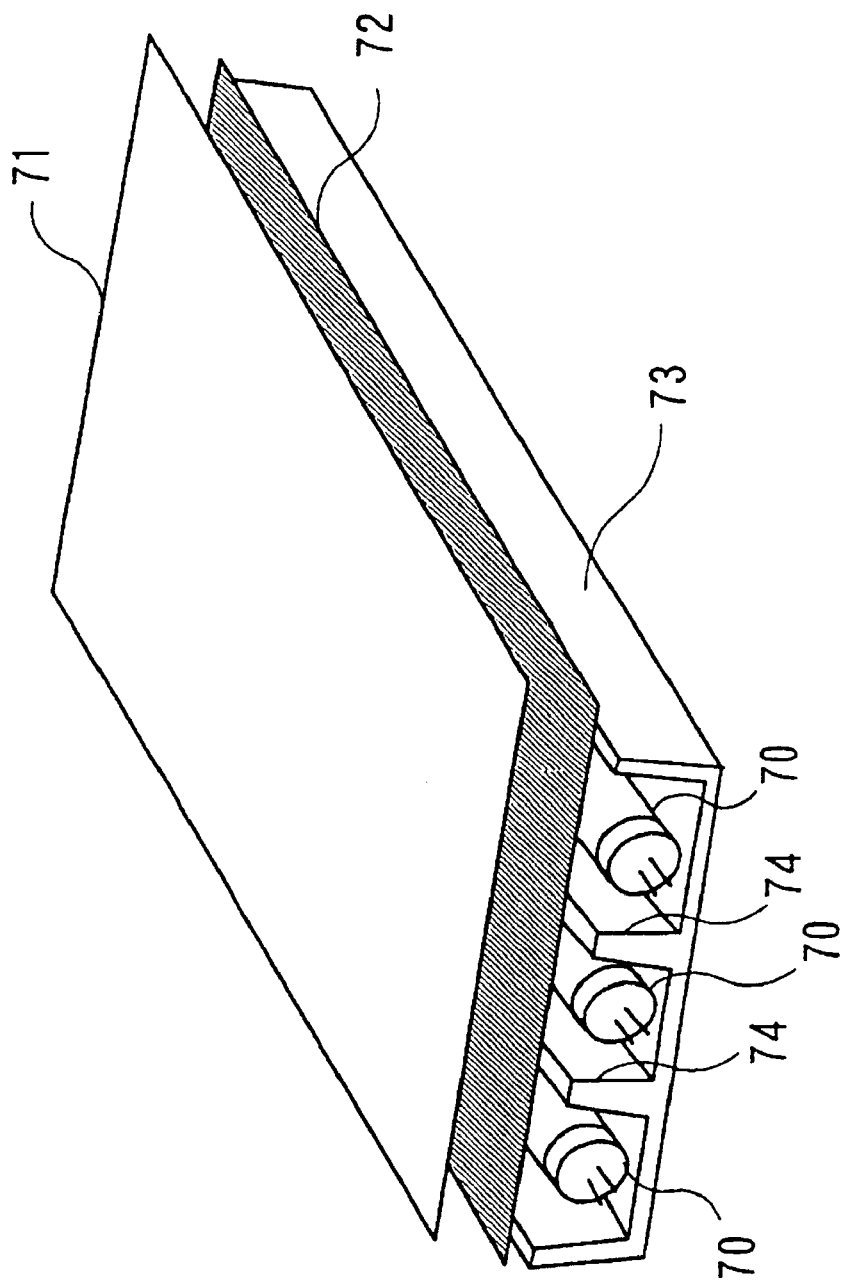
FIG. 7 is a perspective view for illustrating a directly-under-light type backlight structure of a second embodiment.

FIG. 7 is a perspective view of the directly-under-light type backlight comprising the fluorescent tube disposed directly under the liquid crystal display panel of the second embodiment. In the drawing, numeral 71 denotes the diffuser. The diffuser 71 is disposed under the shielding spacer 51 disposed under the liquid crystal display panel 33 shown in FIG. 2. A dimmer 72 or neutral density filter is disposed under the diffuser 71, and a housing 73 for constituting the fluorescent tube unit is disposed under the dimmer 72 or neutral density filter. Three fluorescent tubes 70 are disposed in the housing 73 substantially parallel to one another. A separator 74 protruding toward the dimmer 72 or neutral density filter is formed inside the housing 73. A reflecting film such as silver is evaporated on the inside of the housing 73 and the surface of the separator 74. Moreover, the separator 74 protrudes closer to the dimmer 72 or neutral density filter than the fluorescent tube 70 so that the separator 74 can prevent the entry of the light from the adjacent fluorescent tube 70.

In this embodiment, the interaction of the fluorescent tubes 70 is limited by the separator 74, and thus it is possible to reduce the number of times that the emitted light passes through the glass tube. Also in this embodiment, the same function as the function of the first embodiment can bring the rate of maintenance of luminance of an LCD unit comprising a group of a plurality of fluorescent tubes 70 close to the rate of maintenance of luminance of each single fluorescent tube 70. As a consequence, the extreme deterioration of luminance of the LCD module can be prevented.

Also in the directly-under-light type backlight of the second embodiment, the same effect can be obtained by using the curved fluorescent tube having the U shape or the like instead of the straight fluorescent tube 70.

Figure 8:
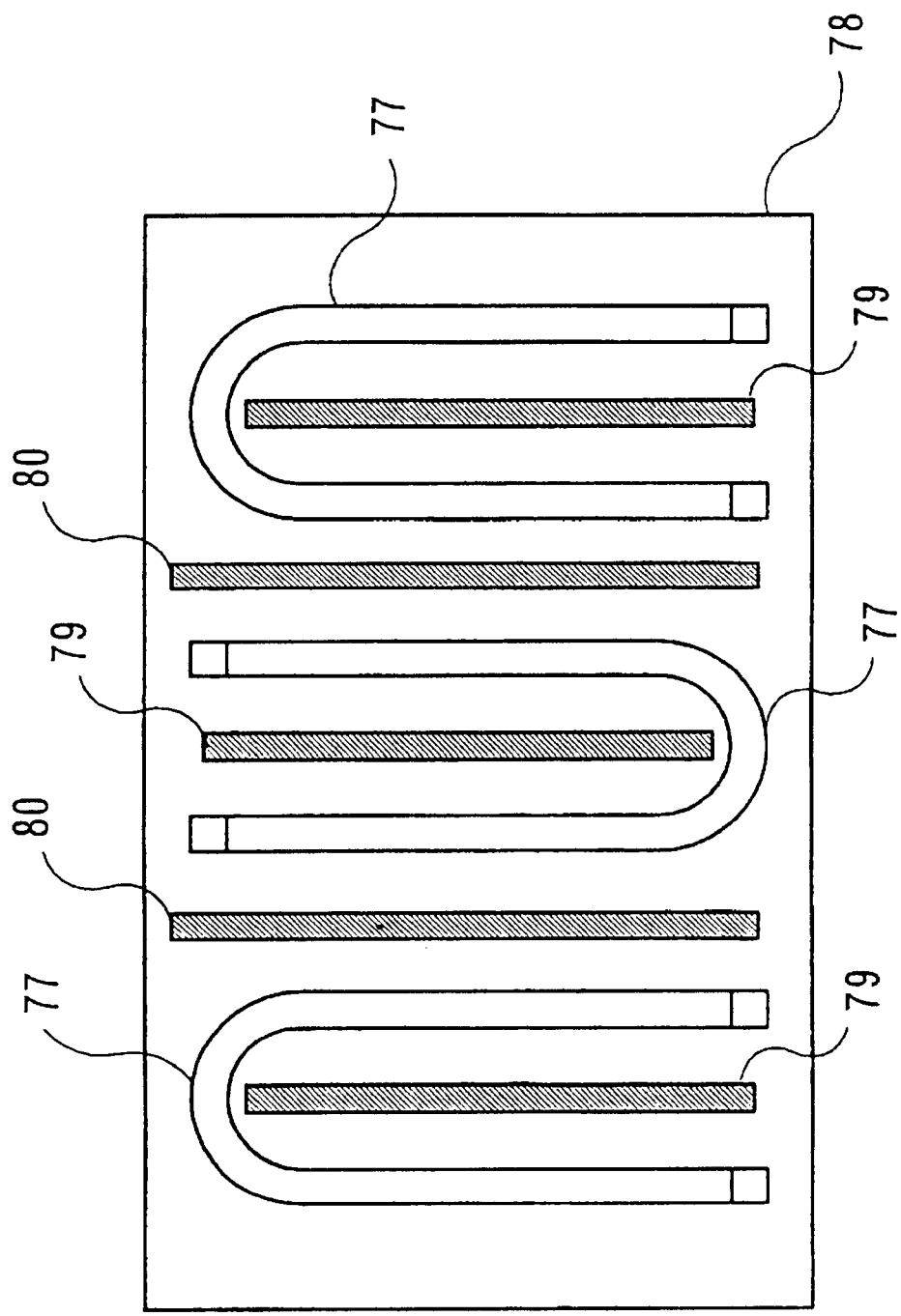
FIG. 8 is an illustration for illustrating another structure of the second embodiment.
Figure 9:
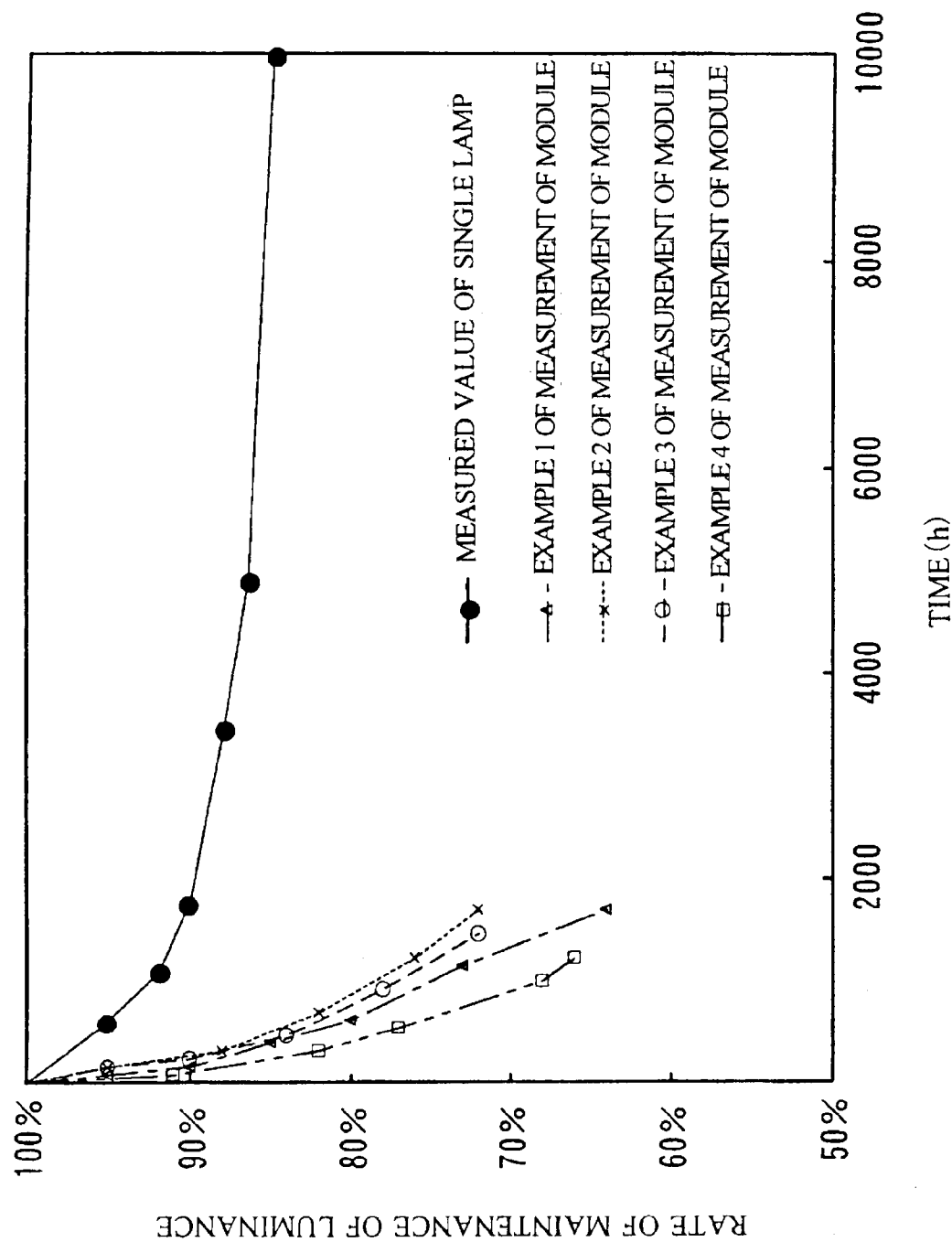
FIG. 9 is a graph of a result of a continuous lighting life test.

FIG. 8 is an illustration for illustrating the directly-under-light type backlight using the U-shaped fluorescent tubes. In the drawing, three U-shaped fluorescent tubes 77 are disposed, and separators 79 and 80 are formed in a housing 78 for holding the fluorescent tubes 77. The separator 79 has the function of separating one curved fluorescent tube, and the separator 80 has the function of separating the fluorescent tubes 77. These separators 79 and 80 limit the entry of the light emitted from each portion of the fluorescent tube 77 into the adjacent portion, and thus it is possible to reduce the number of times that the emitted light passes through the tube wall. Consequently, even when the transmittance of the glass tube is reduced due to the compound deposited on the glass tube wall of the fluorescent tube 77, the influence of the reduction in the transmittance can be minimized. The abrupt deterioration of luminance caused by the interaction of the adjacent glass tubes can be therefore prevented.

As mentioned above, when the curved fluorescent tube is used in the side-light type backlight described in the first embodiment, the same structure as the separator 79 of FIG. 8 can be also adopted.

In the first and second embodiments, the constitution in which the separator is used in the so-called side-light type and directly-under-light type backlights has been described above. In this embodiment, the component for preventing the entry of the light to or from the adjacent fluorescent tube is formed in the fluorescent tube itself.

The same elements as the elements of the first and second embodiments are indicated by the same reference numerals, and the detailed description is omitted.

FIGS. 10(a) and 10(b) are illustrations of the structure of the fluorescent tube of a third embodiment. FIG. 10(a) shows the fluorescent tube having the reflecting film formed on the inner surface of the glass tube of the fluorescent tube. FIG. 10(b) shows the fluorescent tube having the reflecting film formed on an outer surface of the fluorescent tube. These fluorescent tubes can be used in any type of the so-called side-light type and directly-under-light type backlight units in the liquid crystal display.

In FIG. 10(a), numeral 91 denotes the glass tube. The glass tube having an outer diameter of about 3 mm ($\phi$3 mm) and a thickness of about 0.3 mm is used in this embodiment. Numeral 92 denotes the fluorescent material. The fluorescent material 92 converts the ultraviolet light emitted from mercury excited by discharge into a visible light and thereby emits the light. A reflecting film 93 is formed on an inner wall of the glass tube 91 and between the glass tube 91 and the fluorescent material 92. A metalescent material such as aluminum containing many regular reflection components or a white material such as titanium oxide ($TiO_2$) having many diffuse reflection components is used as the material of the reflecting film 93. The reflecting film 93 has an aperture having an angle R1. For the side-light type backlight, the aperture having the angle R1 is positioned so that the aperture may face the light guide. For the directly-under-light type backlight, the aperture having the angle R1 is positioned so that the aperture may face the liquid crystal display panel. Preferably, the angle R1 is such an angle that the light from the adjacent fluorescent tube does not reach into the aperture or such an angle that the radiation of the light to the adjacent fluorescent tube can be prevented. In this embodiment, the angle R1 is set so that an aperture angle may be 77 degrees or less. Although the aperture cannot perfectly prevent the entry and the radiation, the aperture effectively functions as long as the angle R1 is 180 degrees or less.

In FIG. 10(b), numeral 95 denotes the glass tube, numeral 96 denotes the fluorescent material, and numeral 97 denotes the reflecting film. The materials, functions and so on of the glass tube 95, the fluorescent material 96 and the reflecting film 97 are equivalent to those of the glass tube 91, the fluorescent material 92 and the reflecting film 93 shown in FIG. 10(a). However, in FIG. 10(b), the reflecting film 97 is formed on an outer wall surface of the glass tube 95. The reflecting film 97 formed on the outer wall surface has the aperture having an angle R2 for the same reason as the above-described reflecting film 93. Preferably, the angle R2 is 77 degrees or less similarly to the above-mentioned angle R1. In the same manner as the above description, the aperture effectively functions as long as the angle R2 is 180 degrees or less. The aperture is positioned so as to face the light guide or the liquid crystal display panel, whereby the interaction of the adjacent fluorescent tubes can be reduced.

As described above, according to this embodiment, the interaction of the adjacent fluorescent tubes can be reduced by a simple constitution in which the separator as a shielding component is not included in the housing of the fluorescent tube unit. Consequently, the deterioration of luminance associated with the life of the fluorescent tube unit can be brought close to the deterioration of luminance of the single fluorescent tube. Accordingly, the liquid crystal display having the simple constitution and high reliability can be provided.

As described above, according to the present invention, the deterioration of luminance of the backlight for the liquid crystal display panel can be reduced.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A liquid crystal display comprising:
    a light guide placed at the back of a liquid crystal display panel;
    a first fluorescent tube disposed at a position facing along at least one side of said light guide;
    a second fluorescent tube disposed adjacent to said first fluorescent tube; and
    a shielding component for shielding an incoming light from directly entering from said second fluorescent tube into said first fluorescent tube, wherein said shielding component extends to a position closer to said light guide than the position at which said first fluorescent tube and said second fluorescent tube face said light guide.

2. The liquid crystal display according to claim 1 further comprising:
    a housing having an inner surface forming a reflecting surface, said housing being opened to said light guide, said housing being capable of disposing therein said first fluorescent tube and said second fluorescent tube substantially parallel to each other,
    wherein said shielding component includes a shield located between said first fluorescent tube and said second fluorescent tube and formed of a part of said housing extending toward said light guide.

3. The liquid crystal display according to claim 2, wherein the surface of said shield forms the reflecting surface.

4. A liquid crystal display comprising:
    a light guide placed at the back of a liquid crystal display panel;
    a plurality of cold cathode fluorescent tubes disposed at positions facing along at least one side of said light guide and disposed substantially parallel to each other; and
    a separator for separating the lights emitted from said plurality of cold cathode fluorescent tubes, wherein said separator extends to a position closer to said light guide than the position at which said first fluorescent tube and said second fluorescent tube face said light guide.

5. The liquid crystal display according to claim 4, wherein said plurality of cold cathode fluorescent tubes are held in a housing disposed along one side of said light guide, and
    said separator protrudes from the inner surface of said housing toward said light guide.

6. A liquid crystal display comprising:
    a diffuser, and a light guide placed at the back of a liquid crystal display panel;
    a fluorescent tube placed at a position facing along at least one side of said light guide;
    a housing for holding said fluorescent tube; and
    a shielding component disposed in said housing and disposed so as to reduce the number of times that the light emitted from said fluorescent tube passes through a tube wall of said fluorescent tube, wherein said shielding component extends to a position closer to said light guide than the position at which said first fluorescent tube and said second fluorescent tube face said light guide.

7. The liquid crystal display according to claim 6, wherein a plurality of fluorescent tubes are included in said housing, and
    said shielding component is disposed between said plurality of fluorescent tubes and shields the directly incoming light from the adjacent fluorescent tube.

8. The liquid crystal display according to claim 6, wherein said fluorescent tube has a curved tube structure, and
    said shielding component is disposed between adjacent portions of said curved fluorescent tube.

9. A backlight unit comprising:
    a housing opened at one side, for accommodating a plurality of fluorescent tubes therein, wherein said housing is opened to the side of a liquid crystal display panel, and the inner surface of said housing forms a reflecting surface; and
    a shielding component disposed in said housing, for shielding the incoming light from directly entering from one fluorescent tube into the other fluorescent tube and vice verse, wherein said shielding component extends to a position closer to said light guide than the position at which said first fluorescent tube and said second fluorescent tube face said light guide.

10. A backlight unit comprising:
    a light guide placed at the back of a liquid crystal display panel;
    a fluorescent tube unit comprising a plurality of fluorescent tubes or a curved fluorescent tube placed at one side of the light guide;
    wherein said fluorescent tube unit reduces interaction by the incoming light among said fluorescent tubes constituting said fluorescent tube unit by a separator for separating said plurality of fluorescent tubes or the curved fluorescent tube, wherein said separator extends to a position closer to said light guide than the position at which said plurality of fluorescent tubes or said curved fluorescent tube face said light guide, so that a rate of maintenance of luminance of the whole fluorescent tube unit may be brought closer to the rate of maintenance of luminance of a single fluorescent tube constituting said fluorescent tube unit.

11. The backlight unit according to claim 10, wherein said fluorescent tube unit reduces the number of times that the light in said fluorescent tube unit passes through the tube walls of said fluorescent tubes.

* * * * *